(12) United States Patent
Hamamatsu et al.

(10) Patent No.: US 8,875,488 B2
(45) Date of Patent: Nov. 4, 2014

(54) INTERNAL COMBUSTION ENGINE

(75) Inventors: Takehito Hamamatsu, Aichi-ken (JP); Tsutomu Umehara, Aichi-ken (JP); Hiroshi Kuzuyama, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 81 days.

(21) Appl. No.: 13/312,178

(22) Filed: Dec. 6, 2011

(65) Prior Publication Data

US 2012/0144806 A1     Jun. 14, 2012

(30) Foreign Application Priority Data

Dec. 10, 2010   (JP) ................. 2010-275488

(51) Int. Cl.
*F02M 25/06* (2006.01)
*F02D 41/00* (2006.01)
*F02M 25/07* (2006.01)

(52) U.S. Cl.
CPC ....... *F02D 41/0077* (2013.01); *F02M 25/0732* (2013.01); *Y02T 10/47* (2013.01); *F02M 25/0707* (2013.01); *F02M 25/0709* (2013.01)
USPC ................. 60/278; 60/274; 60/311

(58) Field of Classification Search
CPC .......... F02D 41/0077; F02M 25/0707; F02M 25/0732; F02M 25/0709; Y02T 10/47
USPC ................. 60/605.2, 274–324; 123/568.12; 701/108
See application file for complete search history.

(56) References Cited

U.S. PATENT DOCUMENTS 5,560,201 A * 10/1996 Fujishita et al. ................ 60/279
5,771,868 A * 6/1998 Khair ............................. 60/605.2
6,301,888 B1 * 10/2001 Gray, Jr. ........................ 60/605.2
6,378,296 B1 * 4/2002 Yasui et al. .................... 60/277
6,857,263 B2 * 2/2005 Gray et al. .................... 60/605.2
7,131,271 B2 * 11/2006 Bulicz et al. ................. 60/605.2
7,195,006 B2 * 3/2007 Khair et al. ................... 60/605.2
7,299,626 B2 * 11/2007 Barasa et al. ................. 60/297

(Continued)

FOREIGN PATENT DOCUMENTS

| EP | 1 568 865 A1 | 8/2005 |
| JP | 2002-070620 A | 3/2002 |
| JP | 2008-038874 A | 2/2008 |
| JP | 2008-208723 A | 9/2008 |

OTHER PUBLICATIONS

Extended European Search Report for corresponding EP Patent Application No. 11192307.4 issued on Mar. 14, 2012.

*Primary Examiner* — Jesse Bogue
(74) *Attorney, Agent, or Firm* — Sughrue Mion, PLLC

(57) ABSTRACT

An internal combustion engine, in which intake air flows through an intake passage into a combustion chamber and exhaust gas resulting from the combustion in the combustion chamber flows through an exhaust passage, includes an exhaust gas purifier provided in the exhaust passage and having an oxidation catalyst, an LPL-EGR passage connecting between the intake passage and the exhaust passage at a position downstream of the exhaust gas purifier as seen in exhaust gas flow direction, a first estimating device for estimating exhaust gas composition at a position upstream of the exhaust gas purifier, a second estimating device for estimating exhaust gas composition at a position downstream of the exhaust gas purifier, a cylinder temperature adjusting device for adjusting temperature in the combustion chamber, and a controller for controlling the cylinder temperature adjusting device based on the difference in the exhaust gas composition between the first and second estimating devices.

2 Claims, 5 Drawing Sheets

(56) References Cited

U.S. PATENT DOCUMENTS

| | | | |
|---|---|---|---|
| 7,380,400 B2 * | 6/2008 | Barbe et al. | 60/605.2 |
| 7,493,762 B2 * | 2/2009 | Barbe et al. | 60/605.2 |
| 7,512,479 B1 | 3/2009 | Wang | |
| 7,681,394 B2 * | 3/2010 | Haugen | 60/603 |
| 2005/0103013 A1 * | 5/2005 | Brookshire et al. | 60/605.2 |
| 2007/0204598 A1 * | 9/2007 | Wirth et al. | 60/278 |
| 2007/0246028 A1 * | 10/2007 | Fujita et al. | 60/605.2 |
| 2009/0277431 A1 | 11/2009 | Nitzke et al. | |
| 2010/0000213 A1 * | 1/2010 | Onishi et al. | 123/568.11 |
| 2010/0000500 A1 * | 1/2010 | Shimizu et al. | 60/605.2 |
| 2010/0179745 A1 * | 7/2010 | Nakayama et al. | 701/108 |
| 2010/0211293 A1 * | 8/2010 | Yamada et al. | 701/108 |

\* cited by examiner

INTERNAL COMBUSTION ENGINE

BACKGROUND OF THE INVENTION

The present invention relates to an internal combustion engine equipped with an exhaust gas recirculation device that recirculates part of exhaust gas from an exhaust passage downstream of an exhaust gas purifier into an intake passage as EGR gas.

Exhaust gas from an internal combustion engine contains particulate matter or PM mainly composed of soot and unburned fuel. There are known exhaust gas purifiers such as a diesel particulate filter or DPF provided in an exhaust passage of the engine to collect PM in the exhaust gas and as a DPNR system provided in the exhaust passage and having such filter and a NOx storage and reduction catalyst. These exhaust gas purifiers need to be regenerated at an appropriate time interval because the use of such exhaust gas purifiers for a long period of time leads to a reduced purifying performance. Regeneration of DPF is accomplished by increasing DPF temperature to combust and remove the collected PM. The increase of DPF temperature is achieved by injecting fuel into the exhaust gas and oxidizing the injected fuel by an oxidation catalyst located upstream of the DPF for increasing exhaust gas temperature. Regeneration of DPNR system is accomplished by injecting fuel into the exhaust gas to reduce the stored NOx in a rich air-fuel ratio.

There is also known an exhaust gas recirculation device or EGR device by which part of the exhaust gas discharged from the combustion chamber of the engine is recirculated to flow from the exhaust passage into the intake passage in order to reduce the amount of NOx emission from the internal combustion engine. The EGR device has an EGR passage and an EGR valve provided in the EGR passage for adjusting the flow rate of EGR gas. The opening of the EGR valve is controlled so that the EGR rate of the intake gas flowing into the combustion chamber has an optimal value as determined in accordance with the engine operating condition. As an example of such EGR device, there is a device that recirculates EGR gas from the exhaust passage downstream of the exhaust gas purifier into the intake passage.

In the internal combustion engine having such EGR device and the exhaust gas purifier, when fuel is injected into the exhaust gas for regeneration of the exhaust gas purifier during the recirculaion of EGR gas into the intake passage, carbon dioxide concentration and oxygen concentration in the exhaust gas are changed because of the fuel combustion in the exhaust gas purifier, and correspondingly carbon dioxide concentration and oxygen concentration in the recirculated EGR gas are also changed. This causes a difference in the EGR rate between the current value and the target value after the fuel is supplied for regeneration of the exhaust gas purifier, thereby resulting in an unstable combustion in the engine.

To prevent such problem, Japanese Unexamined Patent Application Publication No. 2008-208723 discloses an internal combustion engine in which air flow rate that is correlated to the oxygen concentration is monitored in the intake passage where the EGR gas is introduced, and the opening of the EGR valve is controlled so that no change occurs in the air flow rate after the regeneration of the exhaust gas purifier. Such structure prevents combustion in the engine during the recirculaion of EGR gas from becoming unstable due to the change of the oxygen concentration in the EGR gas caused by catalytic combustion of the fuel injected into the exhaust gas for regeneration of the exhaust gas purifier.

The amount of unburned component in the exhaust gas, such as THC and CO, discharged from the combustion chamber of the internal combustion engine is changed depending on the engine operating condition. For example, when the accelerator pedal is depressed quickly for acceleration of the vehicle, the amount of air and fuel supplied into the combustion chamber is increased for increasing the output of the engine. Although the amount of fuel injected from the injector into the combustion chamber can be changed quickly in response to the change in the target command value, the amount of air introduced into the combustion chamber does not necessarily reach the target value quickly because there is a time lag until the boost pressure reaches the target value and also until the amount of air reaches the target value in response to the change of the throttle valve opening. Such time lag may cause increase of unburned component in the exhaust gas discharged from the combustion chamber.

The unburned component in the exhaust gas is oxidized in the exhaust gas purifier provided in the exhaust passage, and correspondingly the carbon dioxide concentration and the oxygen concentration in the exhaust gas are changed. In the internal combustion engine disclosed in the publication No. 2008-208723, the air flow rate in the intake passage is calculated after and before the fuel is injected into the exhaust gas for regeneration, and the EGR valve opening is adjusted based on the calculated values. However, such EGR control is not based on the change of the oxygen concentration and the carbon dioxide concentration when no regeneration is performed. Thus, when the oxygen concentration and the carbon dioxide concentration in the exhaust gas are changed by the increase of the unburned component in the exhaust gas caused by the factors such as the change in the engine operating condition other than the regeneration of the exhaust gas purifier, the combustion in the engine becomes unstable.

The present invention is directed to providing an internal combustion engine that maintains stable combustion even when EGR gas composition changes due to fuel combustion in an exhaust gas purifier of the engine.

SUMMARY OF THE INVENTION

In accordance with an aspect of the present invention, an internal combustion engine, in which intake air flows through an intake passage into a combustion chamber and exhaust gas resulting from the combustion in the combustion chamber flows through an exhaust passage, includes an exhaust gas purifier provided in the exhaust passage and having an oxidation catalyst, an LPL-EGR passage connecting between the intake passage and the exhaust passage at a position downstream of the exhaust gas purifier as seen in exhaust gas flow direction, a first estimating device for estimating exhaust gas composition at a position upstream of the exhaust gas purifier, a second estimating device for estimating exhaust gas composition at a position downstream of the exhaust gas purifier, a cylinder temperature adjusting device for adjusting temperature in the combustion chamber, and a controller for controlling the cylinder temperature adjusting device based on the difference in the exhaust gas composition between the first and second estimating devices.

Other aspects and advantages of the invention will become apparent from the following description, taken in conjunction with the accompanying drawings, illustrating by way of example the principles of the invention.

DETAILED DESCRIPTION OF THE EMBODIMENTS

Figure 1:
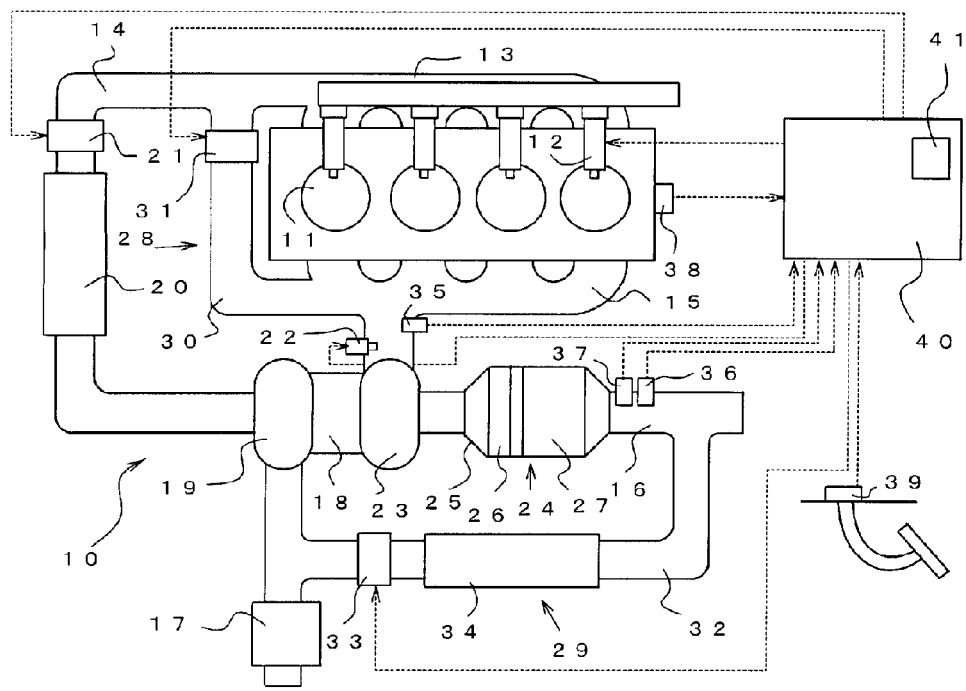
FIG. 1 is an schematic view of an internal combustion engine according to an embodiment of the present invention.

The following will describe the first embodiment of the internal combustion engine according to the present invention with reference to FIGS. 1 through 5. Referring to FIG. 1, the internal combustion engine designated generally by 10 is a direct injection diesel engine having four cylinders 11 into which diesel fuel is injected directly. The present invention is not limited to such type of engine.

Each cylinder 11 or combustion chamber of the engine 10 is equipped with a fuel injector 12 and also with intake and exhaust valves (not shown in the drawing). The cylinders 11 are connected through an intake manifold 13 to an intake passage 14 and also through an exhaust manifold 15 to an exhaust passage 16.

The intake passage 14 is provided with an air cleaner 17, a compressor 19 of a turbocharger 18 for compressing intake air, an intercooler 20 for cooling compressed air, and a throttle valve 21 for adjusting the flow rate of air supplied into the cylinders 11. These components are disposed in this order as seen in the intake air flow direction. The exhaust passage 16 is provided with a fuel injection valve 22 for injecting fuel into exhaust gas, a turbine 23 of the turbocharger 18 driven by exhaust gas pressure, and an exhaust gas purifier 24, which are disposed in this order as seen in the exhaust gas flow direction. The exhaust gas purifier 24 has a structure in which an oxidation catalyst 26 and a DPF 27 or diesel particulate filter are received in a casing 25 that forms part of the exhaust passage 16. Although not shown in the drawing, the turbocharger 18 has at the inlet of the turbine 23 thereof a variable nozzle vane that functions to vary the velocity of exhaust gas flowing into the turbine 23.

The internal combustion engine 10 has two EGR devices, namely, an HPL-EGR device 28 and an LPL-EGR device 29 by which exhaust gas resulting from the combustion in the cylinders 11 is recirculated to flow from the exhaust passage 16 into the intake passage 14 as EGR gas. The HPL-EGR device 28 has an HPL-EGR passage 30 connecting between the exhaust manifold 15 upstream of the fuel injection valve 22 and the intake passage 14 at a position thereof downstream of the throttle valve 21 and an HPL-EGR valve 31 provided in the HPL-EGR passage 30. The LPL-EGR device 29 has an LPL-EGR passage 32 connecting between the exhaust passage 16 at a position thereof downstream of the exhaust gas purifier 24 and the intake passage 14 at a position thereof upstream of the compressor 19 of the turbocharger 18, an LPL-EGR valve 33 (LPL-EGR adjusting device) provided in the LPL-EGR passage 32, and an EGR cooler 34 provided in the LPL-EGR passage 32 at a position upstream of the LPL-EGR valve 33 as seen in the exhaust gas flow direction. The adjustment of flow rate of EGR gas flowing through the HPL- and LPL-EGR passages 30, 32 is done by changing the valve opening of the respective HPL- and LPL-EGR valves 31, 33.

The internal combustion engine 10 has a first air-fuel ratio sensor 35 (first estimating device) and a second air-fuel ratio sensor 36 (second estimating device) in the exhaust passage 16. The first air-fuel ratio sensor 35 is located upstream of the fuel injection valve 22, and the second air-fuel ratio sensor 36 is located downstream of the exhaust gas purifier 24. In the present embodiment, the first and second air-fuel ratio sensors 35, 36, or NF sensors, function to continuously detect the oxygen concentration in the exhaust gas or the exhaust gas composition. The internal combustion engine 10 further has an exhaust gas temperature sensor 37 located downstream of the exhaust gas purifier 24 in the exhaust passage 16, an engine speed sensor 38 for detecting engine speed, and an accelerator sensor 39 for detecting the depressed position of the accelerator pedal.

The internal combustion engine 10 is equipped with an electric control unit 40 generally known as ECU. Receiving signals from the first and second air-fuel ratio sensors 35, 36, the exhaust gas temperature sensor 37, the engine speed sensor 38 and the accelerator sensor 39, the ECU 40 (controller) calculates command values for the fuel injectors 12, the throttle valve 21, the variable nozzle vane of the turbocharger 18, the fuel injection valve 22, the HPL- and LPL-EGR valves 31, 33 and controls the operation of these devices.

The ECU 40 has a memory 41 storing data maps used to determine various conditions based on engine operating condition. The maps include a target EGR rate map for determining a target value of EGR rate, a EGR mode map for determining a desired EGR mode, a basic EGR valve opening map for determining the opening of the HPL- and LPL-EGR valves 31, 33 and the throttle valve 21, a reference $\Delta A/F$ map for determining a reference value of $\Delta A/F$ that represents the difference in air-fuel ratio between the upstream and downstream sides of the exhaust gas purifier 24, and a target $\Delta A/F$ map for determining a target value of $\Delta A/F$. In the present embodiment, the engine operating condition is what can be calculated from parameters such as engine speed and fuel injection quantity, but such calculated value may be corrected by other known parameters such as intake air flow rate monitored by an airflow meter, intake air temperature, engine temperature based on coolant temperature, and ambient pressure.

Each of the above-mentioned maps is in the form of a two-dimensional data table. For example, the target EGR rate map data may be determined when data of engine speed and fuel injection quantity are given. Data of fuel injection quantity can be calculated from data of the position of the accelerator pedal and of the engine speed which are detected by the accelerator sensor 39 and the engine speed sensor 38, respectively. The accelerator sensor 39 and the engine speed sensor 38 correspond to the engine operating condition detector of the present invention.

Though the ECU 40 may perform various manners of control, the following will describe the control performed in the present embodiment.

<DPF Regeneration Control>

The DPF 27 of the exhaust gas purifier 24 includes a porous substrate and functions to collect PM contained in exhaust gas. The use of the DPF 27 for a long period of time finally leads to plugging of the DPF 27 because the amount of PM to be collected on the DPF 27 is limited. Thus, the PM accumulated on the DPF 27 needs to be removed at an appropriate time. This process is generally known as DPF regeneration. In the present embodiment, DPF regeneration is accomplished by injecting fuel into exhaust gas by the fuel injection valve 22. The injected fuel is combusted by the oxidation catalyst 26 thereby to increase the exhaust gas temperature. The PM accumulated on the DPF 27 is combusted and hence removed by such high-temperature exhaust gas. The amount of PM accumulation on the DPF 27 is estimated by the ECU 40 based on the pressure difference between the upstream and downstream sides of the exhaust gas purifier 24 monitored by pressure sensors (not shown). When the pressure difference across the exhaust gas purifier 24 reaches a predetermined level, fuel is injected from the fuel injection valve 22. After the fuel injection for a predetermined period of time, the ECU 40 determines that the removal of PM is completed and then stops the fuel injection.

<Basic EGR Control>

According to the basic EGR control performed by the ECU 40, part of the exhaust gas is introduced into the intake passage 14 depending on the engine operating condition calculated from engine speed and fuel injection quantity. The object of the basic EGR control is, for example, to decrease the cylinder combustion temperature thereby to reduce the amount of NOx present in exhaust gas by introducing exhaust gas or inert gas into the intake passage 14. The ECU 40 calculates an optimal target EGR rate according to the engine operating condition and controls the opening of the HPL- and LPL-EGR valves 31, 33 based on the parameters such as engine speed, fuel injection quantity, throttle opening and boost pressure so that the amount of EGR gas introduced into the intake passage 14 meets the condition of the target EGR rate. The EGR rate means the ratio of the amount of EGR gas to the total amount of intake gas flowing into the cylinders 11. The optimal target EGR rate depends on the engine operating condition. For example, when the ratio of EGR gas to intake air is too small, the object of EGR such as reduction of NOX cannot be accomplished. On the other hand, excessive amount of EGR gas leads to decreased oxygen concentration thereby to increase smoke and hydrocarbon emissions. Thus, accurate EGR rate control is required in EGR control.

Figure 2:
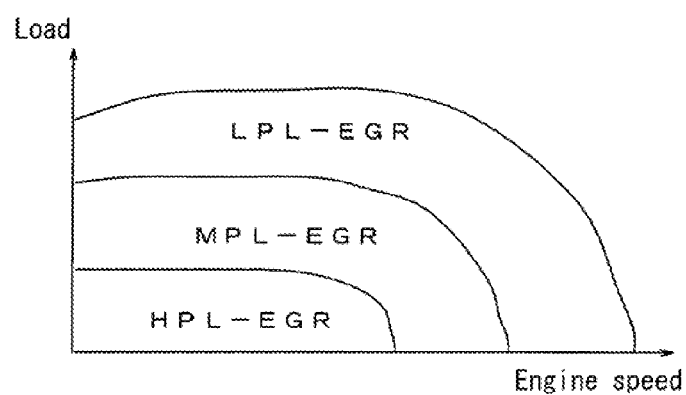
FIG. 2 is a schematic diagram showing an example of map for use to determine EGR operation mode based on engine operating condition.

In the present embodiment, two EGR devices, namely, the HPL-EGR device 28 and the LPL-EGR device 29, are provided for exhaust gas recirculation into the intake passage 14, and two exhaust gas introduction passages are switched depending on engine operating condition. In the basic EGR control, the exhaust gas introduction passage that is suitable for efficient EGR control is determined depending on engine speed and engine load that is represented by fuel injection quantity, as shown in FIG. 2. In a relatively low-speed and low-load region, only the high-response HPL-EGR device 28 is operated because in such region the cylinder combustion temperature is relatively low and the amount of required EGR gas is small. Such operation mode will be hereinafter referred to as HPL mode.

In a high-speed and high-load region, only the LPL-EGR device 29 is operated. In such high-speed and high-load region, a large amount of low-temperature EGR gas is required because the cylinder combustion temperature is high. The LPL-EGR device 29 allows a large amount of EGR gas to flow into the intake passage 14 because all of the exhaust gas flows through the turbine 23 of the turbocharger 18 thereby to increase the boost pressure of intake gas and also because exhaust gas is introduced into the intake passage 14 at a low pressure region upstream of the compressor 19 of the turbocharger 18. Additionally, the provision of the EGR cooler 34 allows low-temperature EGR gas to be introduced into the intake passage 14. Such operation mode will be hereinafter referred to as LPL mode.

In a medium-speed and medium-load region, both of the HPL-EGR device 29 and the LPL-EGR device 28 are operated. Such operation mode will be hereinafter referred to as MPL mode.

When the basic EGR control is in the HPL mode, the exhaust manifold 15 is connected to the intake passage 14 and no oxidation catalyst for combusting fuel is present in the path through which exhaust gas is introduced into the intake passage 14 as EGR gas. Thus, no change occurs in the oxygen concentration and the carbon dioxide concentration in the EGR gas. During the HPL mode wherein the engine is in low-speed and low-load operation, there is less fear that unburned component in exhaust gas is increased. Thus, the EGR rate of the intake air flowing into the combustion chamber can be controlled to a desired EGR rate by normal HPL-EGR valve opening control.

On the other hand, when the EGR control is in the LPL mode, the exhaust passage 16 is connected at a position thereof downstream of the exhaust gas purifier 24 to the intake passage 14 and the oxidation catalyst 26 is present in the path through which exhaust gas is introduced into the intake passage 14 as EGR gas. Thus, when unburned component in exhaust gas is increased, for example, due to boost delay in accelerating vehicle, such unburned component is oxidized or combusted by the oxidation catalyst 26, thereby resulting in decreased oxygen concentration and increased carbon dioxide concentration in exhaust gas. This causes a change in the carbon dioxide concentration and the oxygen concentration in the EGR gas introduced into the intake passage 14. Thus, normal LPL-EGR valve opening control may cause a difference between the EGR rate of the intake gas flowing into the cylinders 11 and the target EGR rate, thereby resulting in lower output and torque fluctuation. A similar problem may occur when the EGR control is in the MPL mode using the LPL-EGR device 29.

Figure 3:
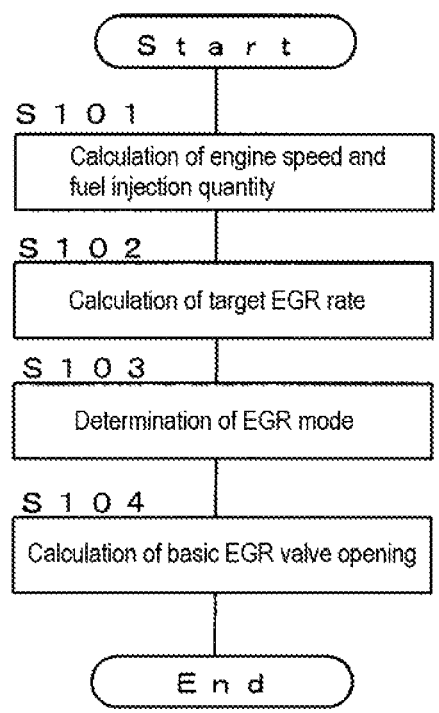
FIG. 3 is an example of flowchart explaining calculation of basic EGR valve opening according to the embodiment of the present invention.

In the present embodiment, the EGR valve control is performed in the manner as described below in order to prevent above-mentioned problem. FIG. 3 is a flow chart showing an example of a procedure of calculating the basic EGR valve opening. This control routine program is executed repeatedly at a given interval of time. Firstly in S101, the ECU 40 calculates the engine speed from output signal of the engine speed sensor 38 and also calculates the fuel injection quantity as the engine load from output signals of the engine speed sensor 38 and the accelerator sensor 39. In the ECU 40, fuel injection quantity is determined as required, for example, by a known method and such data can be used as the present fuel injection quantity.

The ECU 40 calculates the target EGR rate with reference to the above-mentioned target EGR rate map based on the engine operating condition in S102 and then determines the EGR mode in S103 with reference to the above-mentioned EGR mode map based on the engine operating condition. In S104, the ECU 40 calculates the opening of the HPL-EGR valve 31, the opening of the LPL-EGR valve 33, and the opening of the throttle valve 21 based on the basic EGR valve opening map, and this flow is ended.

Figure 4:
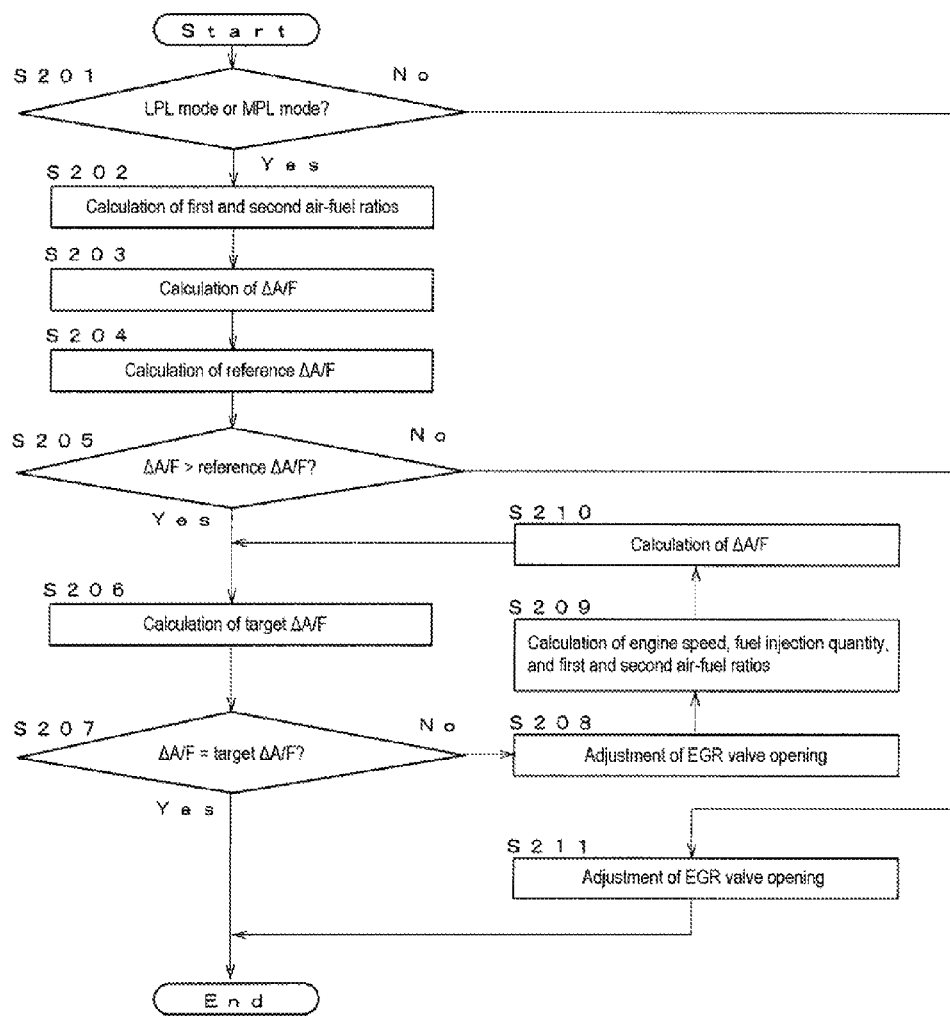
FIG. 4 is an example of flowchart explaining feedback control of the EGR valve according to a first embodiment of the present invention.

The EGR valve opening thus calculated is the opening calculated on the assumption that oxygen concentration in exhaust gas has a value as determined in accordance with engine speed and fuel injection quantity. In determining the EGR valve opening, the change in oxygen concentration due to factors such as the increase of unburned component in exhaust gas is not taken into account. For this reason, EGR valve opening feedback control as shown in FIG. 4 is performed.

<EGR Valve Feedback Control>

In the feedback control of the EGR valve, firstly in S201 the ECU 40 determines whether or not the present EGR mode is in the LPL mode or the MPL mode. This determination is performed by using the calculation result in S102 of FIG. 3. If NO in S201, or if the EGR control is performed in the HPL mode, oxygen concentration and carbon dioxide concentration in exhaust gas does not change because there is no factor to oxidize unburned component in exhaust gas in the path through which exhaust gas is delivered into the intake passage 14. The procedure then goes to S211, where the HPL-EGR valve 31, the LPL-EGR valve 33 and the throttle valve 21 are controlled in accordance with the value calculated in the procedure of calculating basic EGR valve opening, and the flow is ended. In this case, the opening of the LPL-EGR valve 33 is zero, or the LPL-EGR valve 33 is closed.

On the other hand, if YES in S201, or if the EGR control is performed in the LPL mode or the MPL mode, there is a possibility that unburned component in exhaust gas is oxidized by the oxidation catalyst 26 and the oxidized exhaust gas is recirculated into the intake passage 14 as EGR gas. In this case, the procedure goes to S202. In S202, the ECU 40 calculates a first air-fuel ratio that is the air-fuel ratio at a position upstream of the exhaust purifier 24, based on the output signal of the first air-fuel ratio sensor 35, and also a second air-fuel ratio that is the air-fuel ratio at a position downstream of the exhaust purifier 24, based on the output signal of the second air-fuel ratio sensor 36. Then in S203 the ECU 40 calculate the $\Delta A/F$ that is the difference of air-fuel ratio between the upstream and downstream sides of the exhaust gas purifier 24. The $\Delta A/F$ can be calculated for example from the difference between the first and second air-fuel ratios.

In S204 the ECU 40 calculates reference value of $\Delta A/F$ with reference to the reference $\Delta A/F$ map based on the engine operating condition. Then in S205 the ECU 40 determines whether or not the value of $\Delta A/F$ calculated in S203 is greater than the reference value of $\Delta A/F$ calculated in S204. If NO in S205, or if the value of $\Delta A/F$ does not exceed the reference value of $\Delta A/F$, it is thought that no oxygen is consumed by the oxidation catalyst 26. The procedure goes to S211, where the HPL-EGR valve 31, the LPL-EGR valve 33 and the throttle valve 21 are controlled in accordance with the value calculated in the procedure of calculating basic EGR valve opening, and the flow is ended.

If YES in S205, or if the value of $\Delta A/F$ exceeds the reference value of $\Delta A/F$, it is thought that oxygen is consumed by the oxidation catalyst 26, and the procedure goes to S206. In S206 the ECU 40 calculates the target value of $\Delta A/F$ with reference to the target $\Delta A/F$ map based on the engine operating condition. Then in S207, it is determined whether or not the value of $\Delta A/F$ coincides with the target value of $\Delta A/F$. If NO in S207, or if the value of $\Delta A/F$ does not coincide with the target value of $\Delta A/F$, feedback control of the opening of the LPL-EGR valve 33 is performed by the ECU 40 based on the difference between the value of $\Delta A/F$ and the target value of $\Delta A/F$ in S208.

The engine speed, the fuel injection quantity, the first and second air-fuel ratios are calculated in S209, and the value of $\Delta A/F$ is calculated in S210. Then in S206 the target value of $\Delta A/F$ is calculated again, thus the feedback control of the LPL-EGR valve 33 being performed repeatedly until the value of $\Delta A/F$ coincides with the target value of $\Delta A/F$ in S207. When the value of $\Delta A/F$ coincides with the target value of $\Delta A/F$ in S207, the EGR rate coincides with or approximately equal to the target EGR rate, and the flow is ended. In the first embodiment, the combustion temperature in the cylinders 11 may be changed by adjusting the amount of EGR gas to be recirculated into the intake passage 14. The LPL-EGR valve 33 corresponds to the cylinder temperature adjusting device of the present invention.

Figure 5:
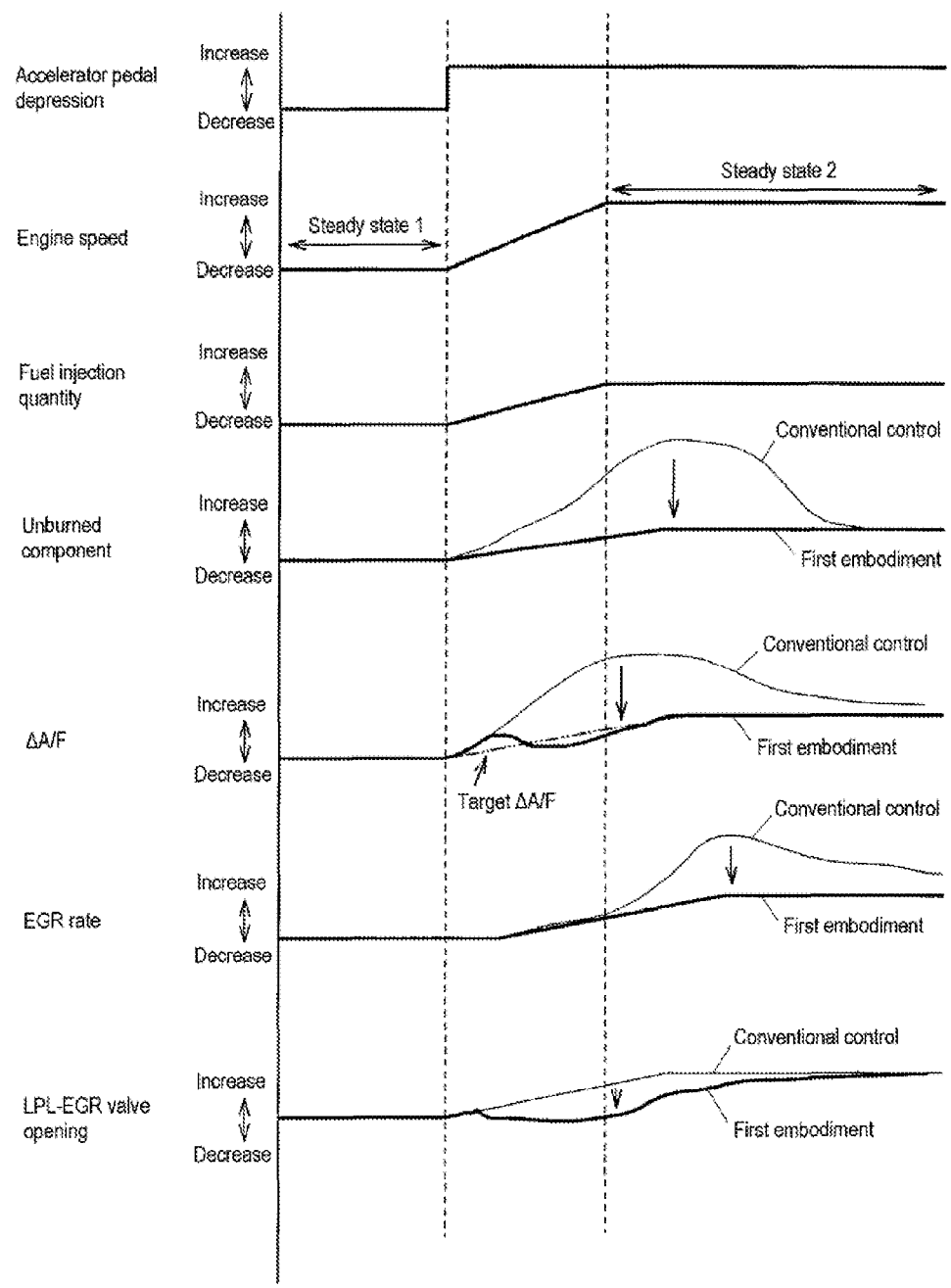
FIG. 5 is an example of time chart showing the operation of the internal combustion engine, comparing between the control of the present embodiment and the conventional control.

FIG. 5 is an example of time chart comparing the control of the present embodiment and the conventional control for the internal combustion engine 10. As shown in the drawing, in the transition period when the engine speed in the steady state 1 is increased to a high speed by depressing the accelerator pedal quickly for rapid acceleration, unburned component in the exhaust gas emitted from combustion chambers is increased because there is a time lag until the boost pressure is increased to the target value in response to the increase of the fuel injection quantity. When such exhaust gas is introduced into the exhaust gas purifier 24, the unburned component is oxidized by the oxidation catalyst 26, so that $\Delta A/F$ or the difference of air-fuel ratio across the exhaust purifier 24 is increased. This state means that oxygen concentration in exhaust gas in the region downstream of the exhaust gas purifier 24 is decreased. In the recirculation of such exhaust gas into the intake passage 14 by the LPL-EGR device 29, when the opening of the LPL-EGR valve 33 is controlled depending on the engine speed and the fuel injection quantity as in the case of the conventional manner, the EGR rate of the intake gas flowing into the combustion chamber becomes higher than the target EGR rate because the oxygen concentration in the recirculated exhaust gas is low. As a result, there still may be a difference between the EGR rate and the target value after the engine speed becomes constant or steady state 2, which may cause unstable combustion in the internal combustion engine 10.

In the EGR valve opening control of the first embodiment of the present invention, feedback control of the LPL-EGR valve 33 is performed so that the $\Delta A/F$ coincides with the reference value of $\Delta A/F$ when the $\Delta A/F$ is increased due to increase of unburned component in exhaust gas. This results in a reduced difference between the EGR rate of the intake gas flowing into the cylinders 11 and the target value, thereby preventing combustion in the internal combustion engine 10 from becoming unstable.

As described above, according to the first embodiment of the internal combustion engine 10 wherein exhaust gas is recirculated by the LPL-EGR device 29 from a region downstream of the exhaust gas purifier 24 into the intake passage 14, the oxygen concentration in the intake gas flowing into the cylinders 11 is maintained at a constant level even when unburned component in the exhaust gas recirculated by the LPL-EGR device 29 is increased due to rapid acceleration, so that stable combustion in the internal combustion engine 10 is maintained.

Figure 6:
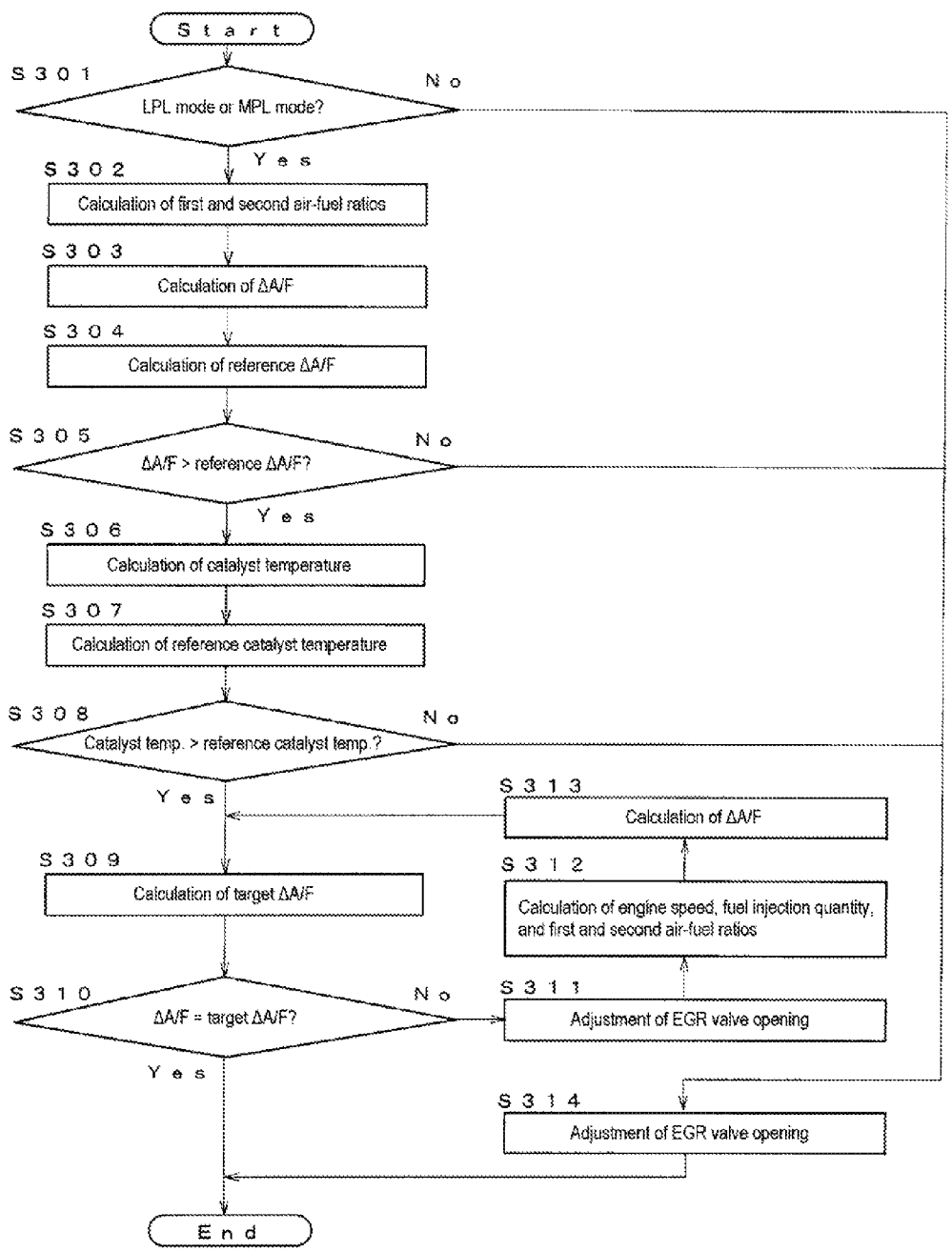
FIG. 6 is an example of flowchart explaining feedback control of the EGR valve according to a second embodiment of the present invention.

The following will describe the second embodiment of the EGR valve control with reference to FIG. 6. In the second embodiment, the temperature of the exhaust gas purifier 24 is used to determine whether or not unburned component in the exhaust gas is oxidized by the oxidation catalyst 26 when the EGR mode is in the LPL mode or the MPL mode.

In the second embodiment, the memory 41 of the ECU 40 stores a catalyst temperature map for determining the temperature of the exhaust gas purifier 24 based on the output signal from the exhaust gas temperature sensor 37, and a reference catalyst temperature map for determining a reference temperature of the exhaust gas purifier 24 based on the engine operating condition, as well as the maps described in the first embodiment. The reference temperature of the exhaust gas purifier 24 is the temperature the exhaust gas purifier 24 reaches when a certain amount of unburned component exists in the exhaust gas, and such reference temperature depends on the engine operating condition calculated from the engine speed and the fuel injection quantity. Each catalyst temperature map may be corrected by parameters such as engine temperature, coolant temperature, oil temperature, ambient temperature, and ambient pressure.

FIG. 6 is an example of flowchart explaining feedback control of the EGR valve according to the second embodiment of the present invention. The procedure of calculating basic EGR valve opening is similar to that of the first embodiment, and the description of the procedure of the second embodiment will be omitted. The procedures of S301 through S305 in FIG. 6 correspond to the respective procedures of S201 through S205 in FIG. 4 of the first embodiment. If YES in S305, or if the value of ΔA/F exceeds the reference value of ΔA/F, it is thought that oxygen is consumed by the oxidation catalyst 26, and the procedure goes to S306. The ECU 40 calculates the temperature of the exhaust gas purifier 24 from the catalyst temperature map in S306, and then calculates the reference temperature of the exhaust gas purifier 24 from the reference catalyst temperature map the in S307.

Then in S308 the ECU 40 determines whether or not the temperature of the exhaust gas purifier 24 calculated in S306 is greater than the reference catalyst temperature calculated in S307. When unburned component in the exhaust gas is oxidized by the oxidation catalyst 26, the oxygen concentration in the exhaust gas is changed and the temperature of the exhaust gas purifier 24 is increased. Thus, if NO in S308, or if the temperature of the exhaust gas purifier 24 does not exceed the reference catalyst temperature, it is thought that the calculated value of ΔA/F is not correct, for example, because of NF sensor failure. The procedure goes to S314, where the HPL-EGR valve 31, the LPL-EGR valve 33 and the throttle valve 21 are controlled in accordance with the value calculated in the procedure of calculating basic EGR valve opening, and the flow is ended. When the EGR control is performed in the LPL mode, the opening of the HPL-EGR valve 31 is zero, or the HPL-EGR valve 31 is closed.

On the other hand, if YES in S308, or if the temperature of the exhaust gas purifier 24 exceeds the reference catalyst temperature, it is thought that oxygen is consumed in the exhaust gas purifier 24. Then feedback control of the opening of the LPL-EGR valve 33 is performed in accordance with the procedures of S309 through S312 corresponding to the procedures of S206 through S209 of the first embodiment.

In the second embodiment, feedback control of the opening of the LPL-EGR valve 33 is performed when there is a change in the oxygen concentration between the upstream and downstream sides of the exhaust gas purifier 24 and also an increase in the temperature of the exhaust gas purifier 24. Typically, when unburned component in the exhaust gas is combusted in the exhaust gas purifier 24, there is a change in the oxygen concentration between the upstream and downstream sides of the exhaust gas purifier 24 and also an increase in the temperature of the exhaust gas purifier 24. The use of the temperature of the exhaust gas purifier 24 as a condition for detecting the combustion of the unburned component in the exhaust gas allows accurate detection of the oxidation of the unburned component in the exhaust gas purifier 24.

The above embodiments may be modified in various ways as exemplified below.

In the previous embodiments, the cylinder temperature adjusting device for adjusting the combustion temperature in the cylinders 11 is embodied by the LPL-EGR valve 33 the opening of which is adjusted by the ECU 40. Alternatively, such adjustment of the combustion temperature may be accomplished by advancing or retarding the timing of fuel injection into the combustion chambers, or by increasing or decreasing the amount of pilot fuel injection quantity before the main injection. The adjustment of the combustion temperature may be also accomplished by adjusting the opening of the throttle valve 21 so that the EGR rate reaches the target value, or by adjusting the opening of the variable nozzle vane of the turbocharger 18 to increase or decrease the boost pressure. In these cases, the fuel injector 12, the throttle valve 21, or the nozzle vane of the turbocharger 18, all of which are controlled by the ECU 40, corresponds to the cylinder temperature adjusting device of the present invention.

Although in the second embodiment the temperature of the exhaust gas purifier 24 is used to determine whether or not the unburned component in the exhaust gas is oxidized, such determination may be done based on the temperature of the oxidation catalyst 26 or of the DPF 27.

Although in the second embodiment the reference catalyst temperature is calculated as a variable value that depends on the engine speed and the fuel injection quantity, the reference catalyst temperature may be a fixed constant value.

What is claimed is:

1. An internal combustion engine in which intake air flows through an intake passage into a combustion chamber and exhaust gas resulting from the combustion in the combustion chamber flows through an exhaust passage, the internal combustion engine comprising:
    an exhaust gas purifier provided in the exhaust passage and having an oxidation catalyst;
    an LPL-EGR passage connecting between the intake passage and the exhaust passage at a position downstream of the exhaust gas purifier as seen in exhaust gas flow direction;
    a first air-fuel ratio sensor provided in the exhaust passage, at a position upstream of the exhaust gas purifier, for estimating exhaust gas composition upstream of the exhaust gas purifier;
    a second air-fuel ratio sensor in the exhaust passage, at a position downstream of the exhaust gas purifier, for estimating exhaust gas composition downstream of the exhaust gas purifier;
    a cylinder temperature adjusting device for adjusting temperature in the combustion chamber, wherein the cylinder temperature adjusting device is an LPL-EGR adjusting device for adjusting the amount of EGR gas flowing through the LPL-EGR passage;
    a detector configured to detect an engine operating condition; and
    a controller configured to calculate a target value based on the detected engine operating condition, to calculate a difference in the exhaust gas composition between the first and second air-fuel ratio sensors, to determine whether the calculated difference in the exhaust gas composition coincides with the target value, and, when the calculated difference in the exhaust gas composition does not coincide with the target value, to control the LPL-EGR adjusting device so that the difference in the exhaust gas composition coincides with the target value.

2. The internal combustion engine according to claim 1, further comprising a sensor for detecting a temperature of the exhaust gas purifier, wherein the controller is configured to control the temperature of exhaust gas purifier so that a detected temperature is greater than a predetermined purifier temperature.

* * * * *